(12) United States Patent
Riddiford et al.

(10) Patent No.: US 7,827,341 B2
(45) Date of Patent: Nov. 2, 2010

(54) NAVIGATION SYSTEM AND METHOD OF FORMING A NAVIGATION SYSTEM

(75) Inventors: Martin Riddiford, London (GB); Andrew Jackson, Wellington (NZ)

(73) Assignee: TomTom International B.V., Amsterdam (NL)

( * ) Notice: Subject to any disclaimer, the term of this patent is extended or adjusted under 35 U.S.C. 154(b) by 75 days.

(21) Appl. No.: 12/223,521

(22) PCT Filed: Feb. 28, 2006

(86) PCT No.: PCT/NL2006/050041
§ 371 (c)(1),
(2), (4) Date: Jan. 12, 2009

(87) PCT Pub. No.: WO2007/100239
PCT Pub. Date: Sep. 7, 2007

(65) Prior Publication Data
US 2009/0212181 A1     Aug. 27, 2009

(51) Int. Cl.
*G06F 13/00*     (2006.01)
(52) U.S. Cl. ............. 710/303; 248/205.1; 361/679.3; 701/213
(58) Field of Classification Search ............. 248/205.1; 361/679.01, 679.02, 679.21, 679.29, 679.34, 361/679.4, 679.41, 679.55, 679.56, 679.58, 361/728, 825; 701/200, 213; 710/303, 304
See application file for complete search history.

(56) References Cited
U.S. PATENT DOCUMENTS

2006/0212213 A1    9/2006   Piekarz
2008/0021634 A1*   1/2008   Diaz .......................... 701/200
2008/0158792 A1*   7/2008   Itoh .......................... 361/679
2009/0152418 A1*   6/2009   Bury ........................ 248/205.3
2009/0154078 A1*   6/2009   Richter ................... 361/679.01

FOREIGN PATENT DOCUMENTS

GB       2 412 254       9/2005
WO       WO 02/082405    10/2002

* cited by examiner

*Primary Examiner*—Glenn A Auve
(74) *Attorney, Agent, or Firm*—Harness, Dickey & Pierce, P.L.C.

(57) ABSTRACT

A navigation system is disclosed for providing navigational directions. It has a navigation device with a body provided with a receiving part. The receiving part has an inner surface provided with a connecting element of a first connection type. The navigation system further includes a docking system arranged to accommodate the navigation device. The docking system has an extending part provided with a connecting element of a second connection type. The connecting element of the second connection type is arranged for connection to the connecting element of the first connection type. The extending part further includes an outer surface with a shape similar to the inner surface of the receiving part of the navigation device. In at least one embodiment, the receiving part is slideable along a trajectory over the outer surface, the trajectory being determined by the shape of both the inner surface of the receiving part of the navigation device and the outer surface of the extending part of the docking system. Particularly, the trajectory is such that the connecting element of the first connection type is guided towards the connecting element of the second connection type for connection.

19 Claims, 6 Drawing Sheets

NAVIGATION SYSTEM AND METHOD OF FORMING A NAVIGATION SYSTEM

TECHNICAL FIELD

The present invention relates to a navigation system for providing navigational directions comprising:

a navigation device comprising a body provided with a receiving part having an inner surface provided with a connecting element of a first connection type; a docking system arranged to accommodate the navigation device provided, the docking system comprising an extending part provided with a connecting element of a second connection type, the connecting element of the second connection type arranged for connection to the connecting element of the first connection type. Also, the present invention relates to a dashboard comprising a docking system suitable for such a navigation system, a vehicle comprising such a navigation system, a navigation device suitable for use in such a navigation system, a docking system suitable for use in such a navigation system and a method of forming such a navigation system.

STATE OF THE ART

Prior art navigation devices based on GPS (Global Positioning System) are well known and are widely employed as in-car navigation systems. Such a GPS based navigation device relates to a computing device which in a functional connection to an external (or internal) GPS receiver is capable of determining its global position. Moreover, the computing device is capable of determining a route between start and destination addresses, which can be input by a user of the computing device. Typically, the computing device is enabled by software for computing a "best" or "optimum" route between the start and destination address locations from a map database. A "best" or "optimum" route is determined on the basis of predetermined criteria and need not necessarily be the fastest or shortest route.

The navigation device may typically be mounted on the dashboard of a vehicle, but may also be formed as part of an on-board computer of the vehicle or car radio. The navigation device may also be (part of) a hand-held system, such as a PDA.

By using positional information derived from the GPS receiver, the computing device can determine at regular intervals its position and can display the current position of the vehicle to the user. The navigation device may also comprise memory devices for storing map data and a display for displaying a selected portion of the map data.

Also, it can provide instructions how to navigate the determined route by appropriate navigation directions displayed on the display and/or generated as audible signals from a speaker (e.g. 'turn left in 100 m'). Graphics depicting the actions to be accomplished (e.g. a left arrow indicating a left turn ahead) can be displayed in a status bar and also be superimposed upon the applicable junctions/turnings etc. in the map itself.

It is known to enable in-car navigation systems to allow the driver, whilst driving in a car along a route calculated by the navigation system, to initiate a route re-calculation. This is useful where the vehicle is faced with construction work or heavy congestion.

It is also known to enable a user to choose the kind of route calculation algorithm deployed by the navigation device, selecting for example from a 'Normal' mode and a 'Fast' mode (which calculates the route in the shortest time, but does not explore as many alternative routes as the Normal mode).

It is also known to allow a route to be calculated with user defined criteria; for example, the user may prefer a scenic route to be calculated by the device. The device software would then calculate various routes and weigh more favourably those that include along their route the highest number of points of interest (known as POIs) tagged as being for example of scenic beauty.

Nowadays, navigation devices are subject to theft. In order to prevent this, the navigation device is removable from a docking system. Currently, connecting the docking system and the navigation device needs precise positioning of both structures with respect to each other. However, frequent connecting and disconnecting of the docking system and the navigation device under numerous non-ideal conditions, e.g. driving on a bumpy road, (dis)connecting under bad light conditions etc., enhances the chances regarding damaging connecting elements of both structures.

SHORT DESCRIPTION

In an embodiment of the navigation system as introduced above, the extending part comprises an outer surface with a shape substantially similar to at least part of the inner surface of the receiving part of the navigation device and the receiving part is slideable along a trajectory over the outer surface, the trajectory being determined by the shape of both the inner surface of the receiving part of the navigation device and the outer surface of the extending part of the docking system, and the trajectory being such that the connecting element of the first connection type is guided towards the connecting element of the second connection type for connection. Examples of elements of a connection type include a male connecting element and a female connecting element.

In an embodiment thereof, the outer surface has a convex shape and the inner surface of the receiving part of the navigation device has a concave shape.

In an embodiment, the docking system comprises a supporting structure and the extending part of the docking system is pivotably mounted on the supporting structure. Examples of supporting structures include a suction cup and a click spring. The supporting structure may be arranged to accommodate a cable.

The invention further relates to a dashboard comprising a docking system suitable for a navigation system in one of aforementioned embodiments.

The invention further relates to a vehicle comprising a navigation system of one of aforementioned embodiments.

The invention further relates to a navigation device suitable for use in a navigation system of one of aforementioned embodiments.

The invention further relates to a docking system suitable for use in a navigation system of one of aforementioned embodiments.

Finally, the invention relates to a method of forming a navigation system, the method comprising:

providing a navigation device comprising a body provided with a receiving part having an inner surface provided with a connecting element of a first connection type;

providing a docking system arranged to accommodate the navigation device, the docking system comprising an extending part provided with a connecting element of a second connection type, the connecting element of the second connection type arranged for connection to connecting element of the first connection type, and the extending part comprising an outer surface with a shape substantially similar to at least part of the inner surface of the receiving part of the navigation device;

sliding the receiving part along a trajectory over the outer surface, the trajectory being determined by the shape of both the inner surface of the receiving part of the navigation device and the outer surface of the extending part of the docking system, and the trajectory being such that the connecting element of the first connection type is substantially guided towards the connecting element of the second connection type for connection.

SHORT DESCRIPTION OF THE DRAWINGS

Embodiments will now be described, by way of example only, with reference to the accompanying schematic drawings in which corresponding reference symbols indicate corresponding parts, and in which.

DETAILED DESCRIPTION

Figure 1:
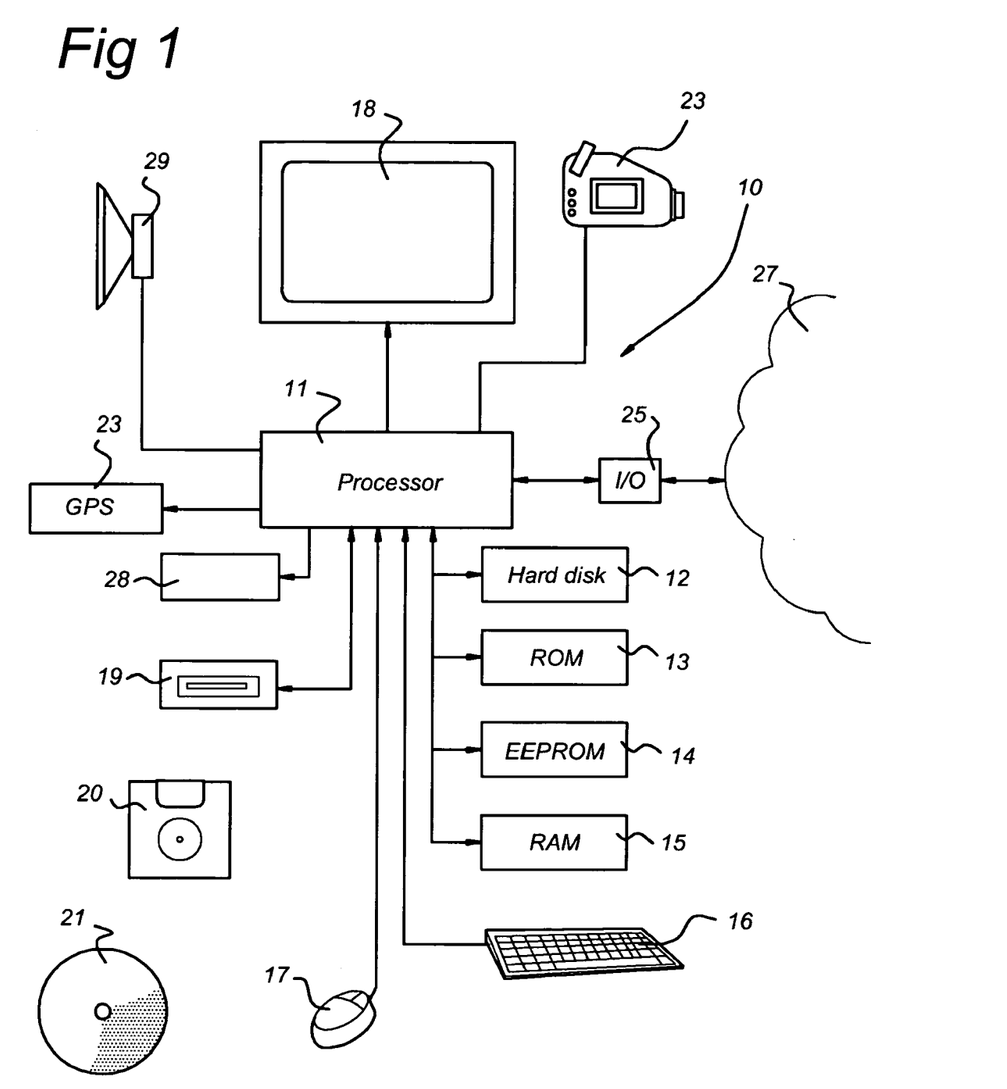
FIG. 1 schematically depicts a schematic block diagram of a navigation device.

FIG. 1 shows a schematic block diagram of an embodiment of a navigation device 10, comprising a processor unit 11 for performing arithmetical operations. The processor unit 11 is arranged to communicate with memory units that store instructions and data, such as a hard disk 12, a Read Only Memory (ROM) 13, Electrically Erasable Programmable Read Only Memory (EEPROM) 14 and a Random Access Memory (RAM) 15. The memory units may comprise map data 22. This map data may be two dimensional map data (latitude and longitude), but may also comprise a third dimensions (height). The map data may further comprise additional information such as information about petrol/gas stations, points of interest. The map data may also comprise information about the shape of buildings and objects along the road.

The processor unit 11 may also be arranged to communicate with one or more input devices, such as a keyboard 16 and a mouse 17. The keyboard 16 may for instance be a virtual keyboard, provided on a display 18, being a touch screen. The processor unit 11 may further be arranged to communicate with one or more output devices, such as a display 18, a speaker 29 and one or more reading units 19 to read for instance floppy disks 20 or CD ROM's 21. The display 18 could be a conventional computer display (e.g. LCD) or could be a projection type display, such as the head up type display used to project instrumentation data onto a car windscreen or windshield. The display 18 may also be a display arranged to function as a touch screen, which allows the user to input instructions and/or information by touching the display 18 with his finger.

The speaker 29 may be formed as part of the navigation device 10. In case the navigation device 10 is used as an in-car navigation device, the navigation device 10 may use speakers of the car radio, the board computer and the like.

The processor unit 11 may further be arranged to communicate with a positioning device 23, such as a GPS receiver, that provides information about the position of the navigation device 10. According to this embodiment, the positioning device 23 is a GPS based positioning device 23. However, it will be understood that the navigation device 10 may implement any kind of positioning sensing technology and is not limited to GPS. It can hence be implemented using other kinds of GNSS (global navigation satellite system) such as the European Galileo system. Equally, it is not limited to satellite based location/velocity systems but can equally be deployed using ground-based beacons or any other kind of system that enables the device to determine its geographical location.

However, it should be understood that there may be provided more and/or other memory units, input devices and read devices known to persons skilled in the art. Moreover, one or more of them may be physically located remote from the processor unit 11, if required. The processor unit 11 is shown as one box, however, it may comprise several processing units functioning in parallel or controlled by one main processor that may be located remote from one another, as is known to persons skilled in the art.

The navigation device 10 is shown as a computer system, but can be any signal processing system with analog and/or digital and/or software technology arranged to perform the functions discussed here. It will be understood that although the navigation device 10 is shown in FIG. 1 as a plurality of components, the navigation device 10 may be formed as a single device.

The navigation device 10 may use navigation software, such as navigation software from TomTom B.V. called Navigator. Navigator software may run on a touch screen (i.e. stylus controlled) Pocket PC powered PDA device, such as the Compaq iPaq, as well as devices that have an integral GPS receiver 23. The combined PDA and GPS receiver system is designed to be used as an in-vehicle navigation system. The embodiments may also be implemented in any other arrangement of navigation device 10, such as one with an integral GPS receiver/computer/display, or a device designed for non-vehicle use (e.g. for walkers) or vehicles other than cars (e.g. aircraft).

Figure 2:
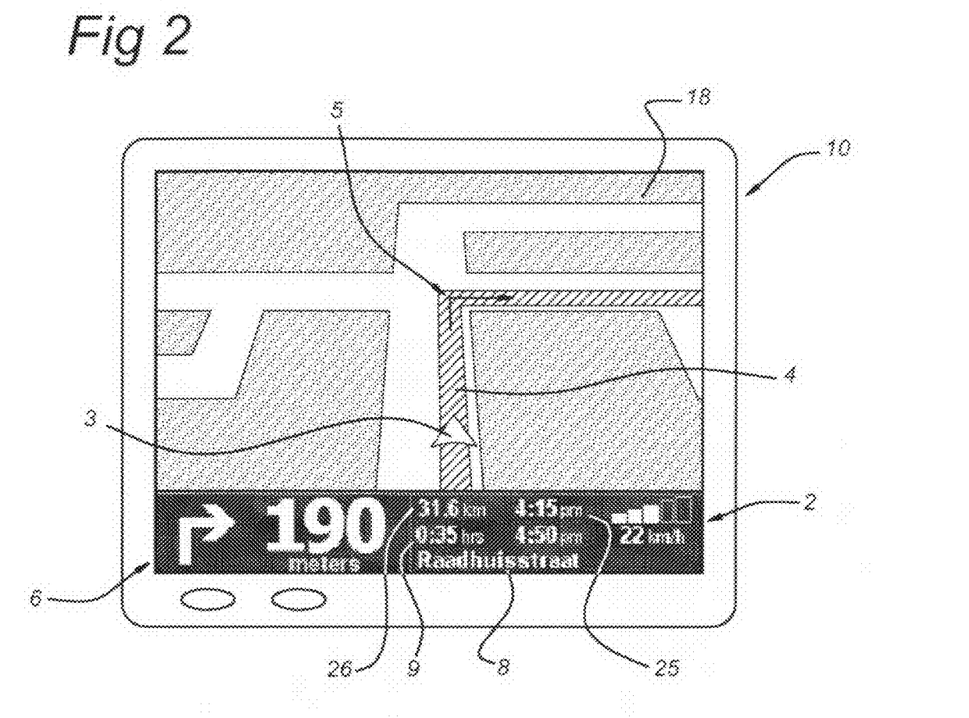
FIG. 2 schematically depicts a schematic front view of a navigation device.

FIG. 2 depicts a navigation device 10 as described above.

Navigator software, when running on the navigation device 10, causes a navigation device 10 to display a normal navigation mode screen at the display 18, as shown in FIG. 2. This view may provide driving instructions using a combination of text, symbols, voice guidance and a moving map. Key user interface elements are the following: a 3-D map occupies most of the screen. It is noted that the map may also be shown as a 2-D map.

The map shows the position of the navigation device 10 and its immediate surroundings, rotated in such a way that the direction in which the navigation device 10 is moving is always "up". Running across the bottom quarter of the screen may be a status bar 2. The current location of the navigation device 10 (as the navigation device 10 itself determines using conventional GPS location finding) and its orientation (as inferred from its direction of travel) is depicted by a position arrow 3.

A route 4 calculated by the device (using route calculation algorithms stored in memory devices 11, 12, 13, 14, 15 as applied to map data stored in a map database in memory devices 11, 12, 13, 14, 15) is shown as darkened path. On the route 4, all major actions (e.g. turning corners, crossroads, roundabouts etc.) are schematically depicted by arrows 5 overlaying the route 4.

The status bar 2 also includes at its left hand side a schematic icon depicting the next action 6 (here, a right turn). The status bar 2 also shows the distance to the next action (i.e. the right turn—here the distance is 50 meters) as extracted from a database of the entire route calculated by the device (i.e. a list of all roads and related actions defining the route to be taken). Status bar 2 also shows the name of the current road 8, the estimated time before arrival 9 (here 2 minutes and 40 seconds), the actual estimated arrival time 25 (11.36 am) and the distance to the destination 26 (1.4 Km). The status bar 2 may further show additional information, such as GPS signal strength in a mobile-phone style signal strength indicator.

As already mentioned above, the navigation device may comprise input devices, such as a touch screen, that allows the users to call up a navigation menu (not shown). From this menu, other navigation functions can be initiated or controlled. Allowing navigation functions to be selected from a menu screen that is itself very readily called up (e.g. one step away from the map display to the menu screen) greatly simplifies the user interaction and makes it faster and easier. The navigation menu includes the option for the user to input a destination.

The actual physical structure of the navigation device 10 itself may be fundamentally no different from any conventional handheld computer, other than the integral GPS receiver 23 or a GPS data feed from an external GPS receiver. Hence, memory devices 12, 13, 14, 15 store the route calculation algorithms, map database and user interface software; a processor unit 12 interprets and processes user input (e.g. using a touch screen to input the start and destination addresses and all other control inputs) and deploys the route calculation algorithms to calculate the optimal route. 'Optimal' may refer to criteria such as shortest time or shortest distance, or some other user-related factors.

More specifically, the user inputs his start position and required destination into the navigation software running on the navigation device 10, using the input devices provided, such as a touch screen 18, keyboard 16 etc. The user then selects the manner in which a travel route is calculated: various modes are offered, such as a 'fast' mode that calculates the route very rapidly, but the route might not be the shortest; a 'full' mode that looks at all possible routes and locates the shortest, but takes longer to calculate etc. Other options are possible, with a user defining a route that is scenic—e.g. passes the most POI (points of interest) marked as views of outstanding beauty, or passes the most POIs of possible interest to children or uses the fewest junctions etc.

Roads themselves are described in the map database that is part of navigation software (or is otherwise accessed by it) running on the navigation device 10 as lines—i.e. vectors (e.g. start point, end point, direction for a road, with an entire road being made up of many hundreds of such sections, each uniquely defined by start point/end point direction parameters). A map is then a set of such road vectors, plus points of interest (POIs), plus road names, plus other geographic features like park boundaries, river boundaries etc, all of which are defined in terms of vectors. All map features (e.g. road vectors, POIs etc.) are defined in a co-ordinate system that corresponds or relates to the GPS co-ordinate system, enabling a device's position as determined through a GPS system to be located onto the relevant road shown in a map.

Route calculation uses complex algorithms that are part of the navigation software. The algorithms are applied to score large numbers of potential different routes. The navigation software then evaluates them against the user defined criteria (or device defaults), such as a full mode scan, with scenic route, past museums, and no speed camera. The route which best meets the defined criteria is then calculated by the processor unit 11 and then stored in a database in the memory devices 12, 13, 14, 15 as a sequence of vectors, road names and actions to be done at vector end-points (e.g. corresponding to pre-determined distances along each road of the route, such as after 100 meters, turn left into street x).

Navigation device 10 may be separable from a docking system. As a result of its separability, the navigation device 10 may be disconnected from the docking system, which is e.g. located in a vehicle, and connected to another docking system at a different location, e.g. at a desk while being connected to a desktop computer. The docking system may comprise a power supply or a network connection. By connecting the navigation device 10 and the docking system, the navigation device 10 may be powered, or, in case the navigation device 10 itself comprises a power unit, such a unit may be "refilled". Furthermore, the connection of navigation device 10 and the docking system may provide a network connection, like a connection to the Internet.

Figure 3A:
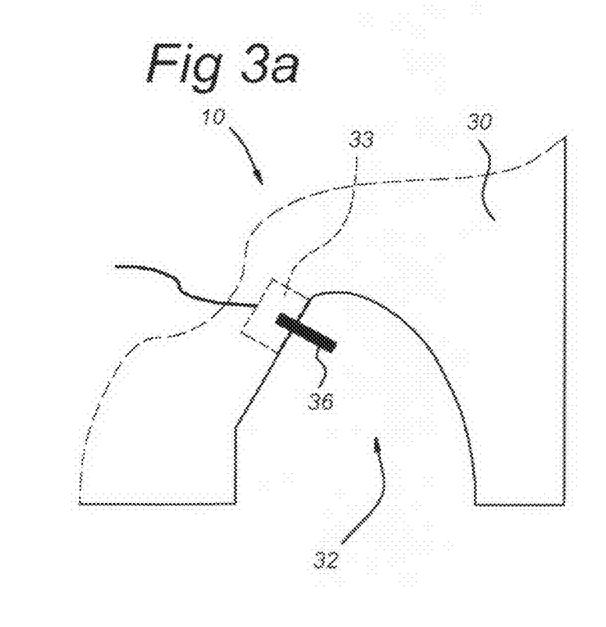
FIGS. 3a-e schematically depict a first concept of connecting according to embodiments of the present invention.
Figure 3B:
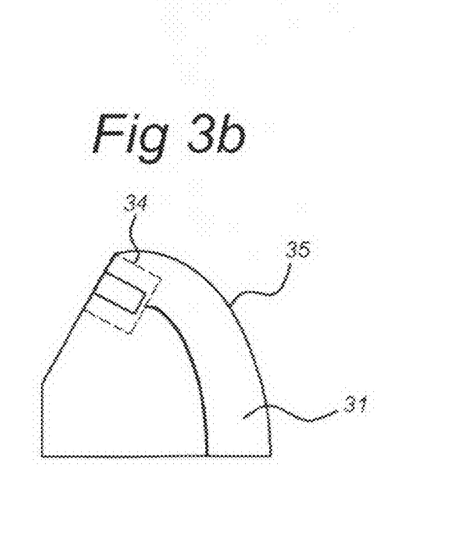

FIGS. 3*a-e* schematically depict a first concept of connecting according to embodiments of the present invention. FIGS. 3*a* and 3*b* schematically depict cross sectional views of a receiving part 30 of navigation device 10 and an extending part 31 of a docking system respectively when these two structures are not connected. A material that may be used for a chassis of the navigation device 10 is an aluminum alloy. The docking system may be constructed from polycarbonate-acrylonitrile butadiene styrene (PC-ABS) plastic.

For connection, navigation device 10 comprises a body provided with a receiving part 30, i.e. a cavity 32. The cavity has an inner surface provided with a connecting element 33. Similarly, the extending part 31 comprises a connecting element 34. Connecting element 33 and connecting element 34 are complementary, i.e. connecting elements 33, 34 are arranged to connect with each other. In FIGS. 3*a, c*-e, connecting element 33 is of a male connecting type, while connecting element 34 in FIGS. 3*b-e* is of a female connecting type.

This choice of connection type is preferred in a vehicle environment for safety reasons. The docking system may be present in a vehicle without navigation device connected to it. To minimize risks regarding injuries, that are caused by extending structures or parts thereof, sharp edges or the like need to be avoided as much as possible. A connecting element of a female connection type does not extend into space as pronounced as does a connecting element of a male connection type.

It must, however, be understood that in other embodiments the connecting types may be interchanged. The extending part 31 of the docking system comprises a guiding outer surface 35. The cavity 32 of the navigation device 10 has an inner surface complimentary to the guiding outer surface 35 of the docking system. In an embodiment the guiding outer surface 35 of the docking system has a convex shape and the inner surface of the cavity 32 of the navigation device 10 has a concave shape.

Figure 3C:
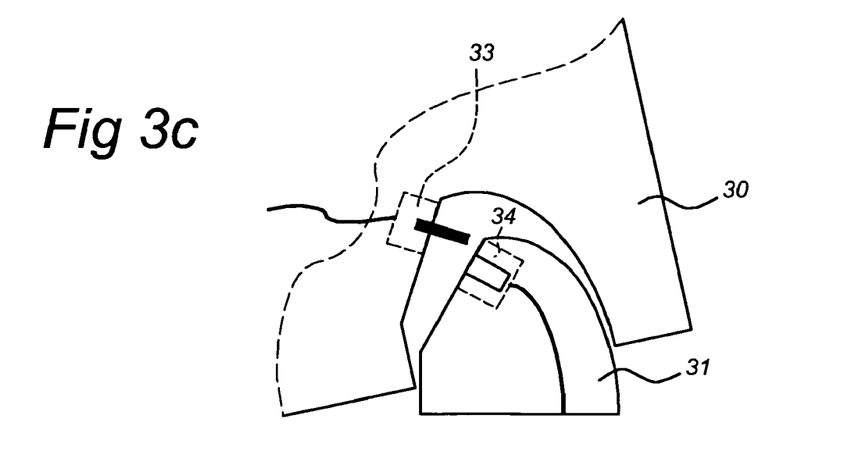

FIG. 3c schematically depicts both navigation device 10 and extending part 31 of the docking system at a stage during connecting connecting elements 33, 34 with each other. During the connecting process, part of the inner shape slides along a trajectory over the extending part 31 of the docking system while in contact with the guiding outer surface 35. Thus, connecting element 33 is guided towards connecting element 34 for connection. The trajectory is determined by the shape of the inner surface of the cavity 32 of the navigation device 10 together with the complimentary shape of the guiding outer surface 35 of the docking system. In an embodiment, the extending part 31 has a radius larger than 2.5 mm to comply with requirements of some European automotive legislation.

Figure 3D:
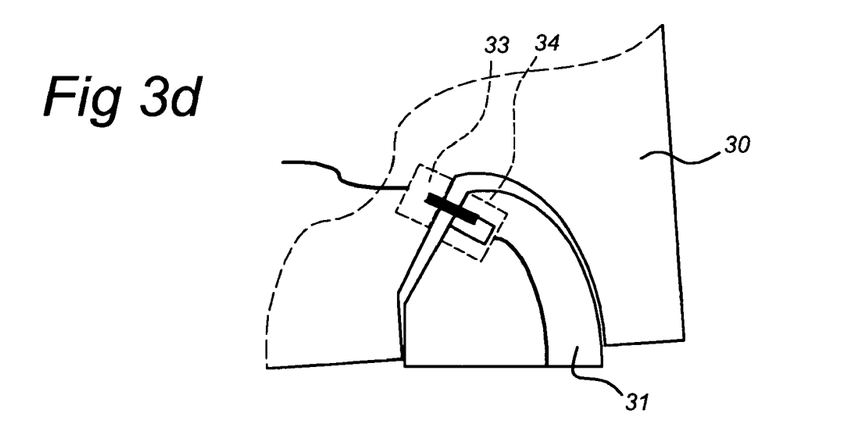

FIG. 3d schematically depicts the situation when the navigation device 10 is almost connected to the docking system. The cavity 32 is now almost entirely occupied by the extending part 31 of the docking system. Furthermore, the connecting element 33 connects substantially in line with the connecting element 34. Both connecting elements 33, 34 are, at the time they come together, in the same plane. To enhance this aspect even further, connecting element 33 may be provided with at least one guiding post (not shown). Even if the navigation device 10 is connected to the docking system under unstable conditions, e.g. in a moving car on a bumpy road, the navigation device 10 can be connected to the docking system without damaging the connecting elements 33, 34.

Figure 3E:
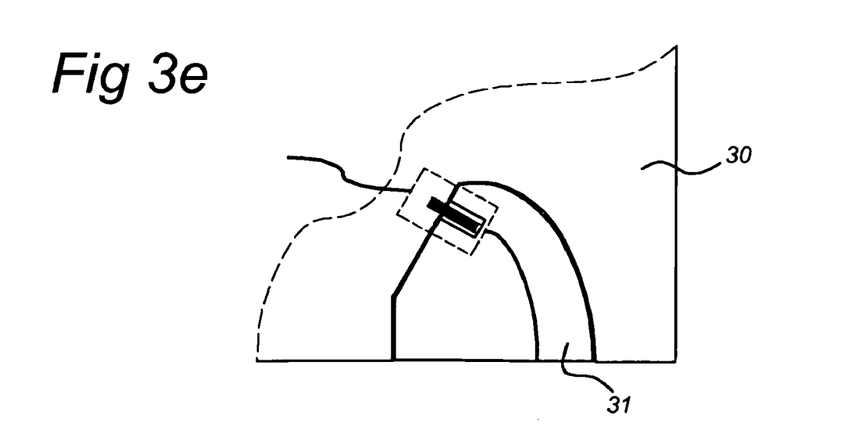

Finally, FIG. 3e schematically depicts a connected assembly of navigation device 10 and the extending part 31 of the docking system. The inner surface of the cavity 32 of the navigation device 10 and the guiding outer surface of the extending part 31 of the docking system may be precisely engineered to allow enough room for material expansion and contraction, while still allowing an uncomplicated docking procedure.

Figure 4A:
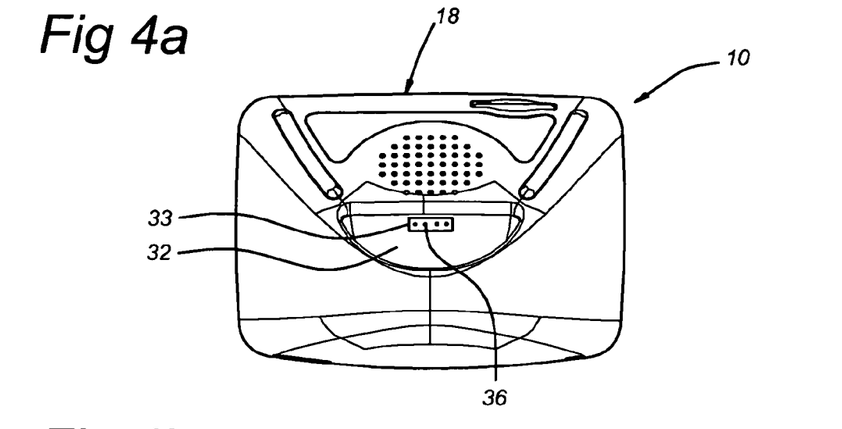
FIGS. 4a, 4b schematically depict a bottom and side view respectively of a navigation device.
Figure 4B:
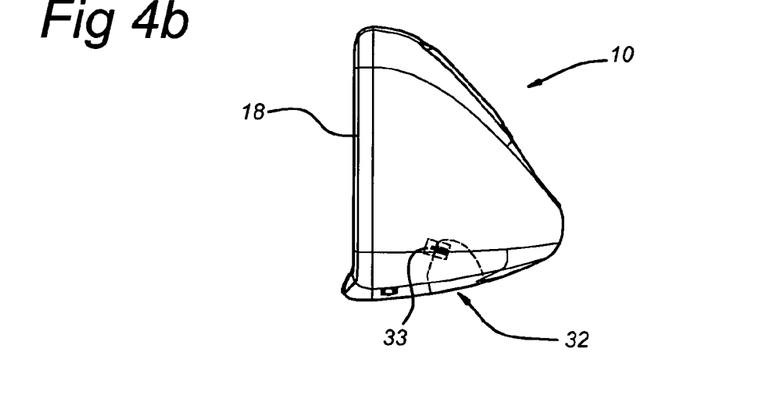

FIGS. 4a, 4b schematically depict a bottom and side view respectively of a navigation device 10 arranged for connection in accordance with the connecting concept depicted in FIGS. 3a-e. In FIG. 4b, the cavity 32 is depicted with dashed lines. Although the connecting element 33 shows four connection pins 36, it must be understood that this number is arbitrary. Connecting element 33 may comprise more or less connection pins 36 or, in case of a female type connecting element 33, connection holes.

Figure 5A:
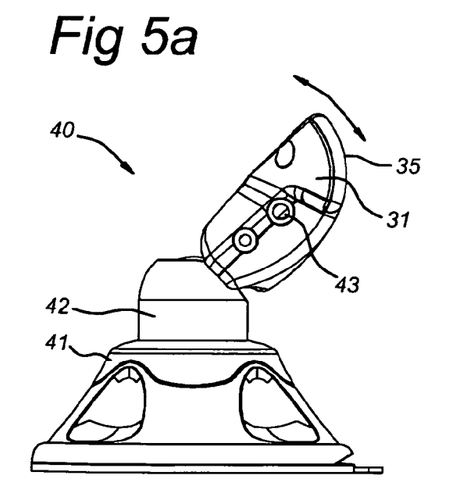
FIGS. 5a, 5b schematically depict a side and bottom view of a docking system according to an embodiment of the present invention.
Figure 5B:
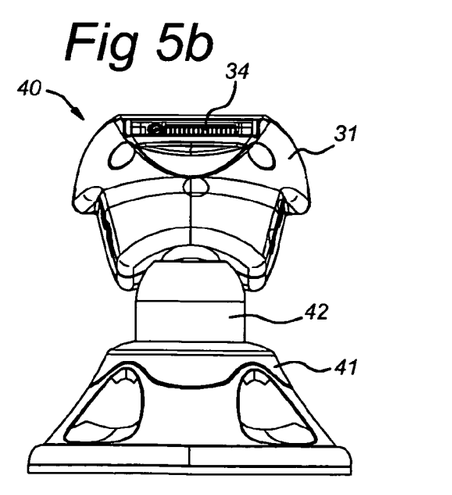

FIGS. 5a, 5b schematically depict a side and front view respectively of a docking system 40 according to an embodiment arranged for disjoinable attachment to a substantially flat surface (not shown), e.g. a car window. For this purpose, the docking system 40 of this embodiment comprises a suction cup 41. The extending part 31 of the docking system 40 may be pivotably mounted on a supporting structure, i.e. directly on the suction cup 41 or on a standard 42 that, if present, is connected with the suction cup 41. The pivoting ability of the extending part 31 enables a user to adjust the orientation of the navigation system after connection of the navigation device 10 with the docking system 40. If the extending part 31 is mounted on a standard 42 further adjustment of the orientation of the navigation system may be achieved by pivotably connecting the standard 42 to the suction cup 41. The adjustments enable the user to optimize the orientation of the display 18 of the navigation device 10. To maintain an optimized position of the display 18, the connections between extending part 31 and standard 42 as well as between standard 42 and suction cup 41 or the connection between extending part 31 and suction cup 41 may be fixable with fixation elements like screws 43 or the like.

Figure 6A:
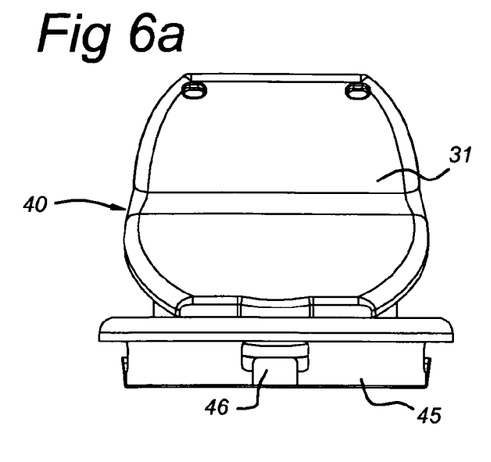
FIG. 6a schematically depicts a front view of a docking system according to another embodiment of the present invention in a "closed" position.
Figure 6B:
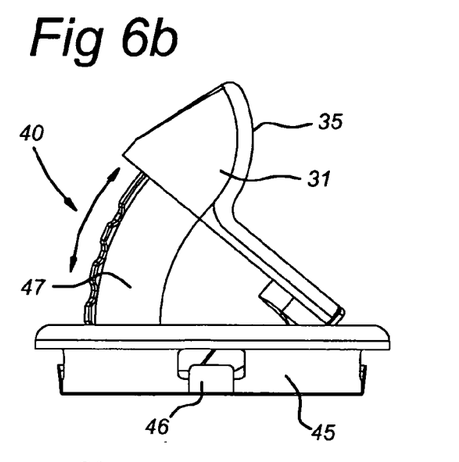
FIGS. 6b, 6c schematically depict a side and front view respectively of the docking system depicted in FIG. 6a in an "open" position.
Figure 6C:
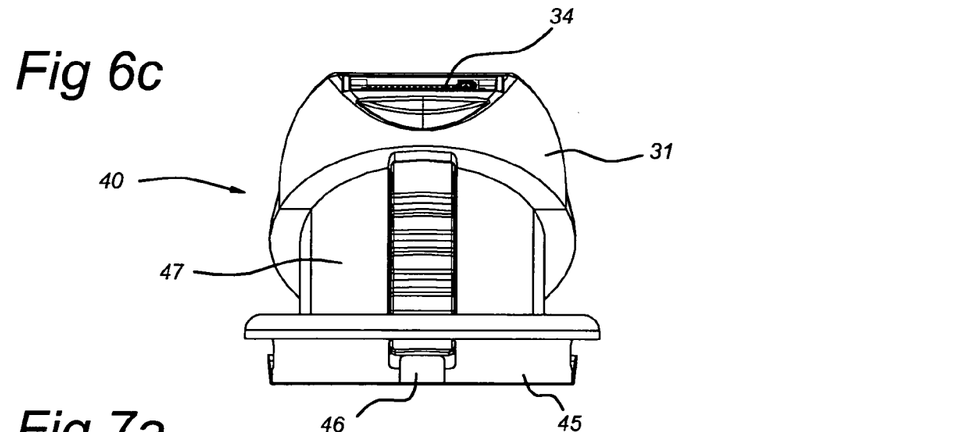

FIG. 6a schematically depicts a schematic view of a docking system according to an embodiment arranged for integration in a substantially flat surface, e.g. a dashboard of a vehicle, in a "closed" position. FIGS. 6b, 6c schematically depict a side and front view respectively of the docking system depicted in FIG. 6a in an "open" position.

In this embodiment, the extending part 31 of the docking system 40 is pivotably mounted on a supporting structure 45. The supporting structure 45 is again arranged to be disjoinably connected to the substantially flat surface (not shown), such that it fits in a suitable recess therein. For this purpose, the supporting structure 45 may comprise at least one click spring 46.

In the "closed" position, depicted in FIG. 6a, only the extending part 31 of the docking system 40 according to this embodiment extends from the substantially flat surface. However, in order to connect the navigation device 10 with the docking system 40, more space may be needed. Therefore, the extending part 31 of the docking system 40 may fold out towards an "open" position, i.e. the position depicted in FIGS. 6b, 6c. A trajectory between aforementioned two positions may be mechanically controlled by a foldout-guiding element 47. To prevent random movement between the "closed" and "open" position, for instance due to instantaneous acceleration or braking of a vehicle, the extending part 31 may be fixed in these positions in ways known to persons skilled in the art, e.g. a locking mechanism.

In case the navigation device 10 is not connected to the docking system 40, the docking system 40 is preferably in its "closed" position. In this position, only a relatively small portion of the docking system 40 extends into the surrounding environment. Safety issues encourage an absence of such extending portions and/or elements as much as possible.

Figures 7A, 7B:
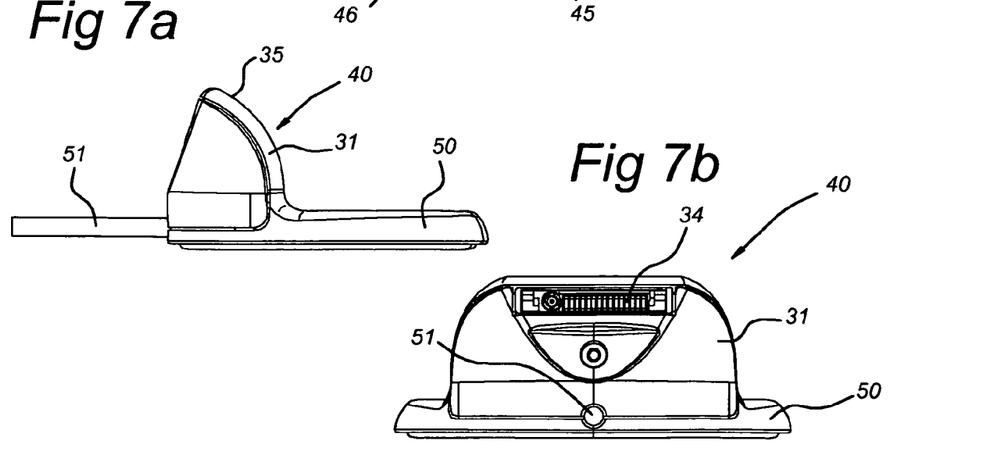
FIGS. 7a, 7b schematically depict a side and front view respectively of a docking system according to yet another embodiment of the present invention.

FIGS. 7a, 7b schematically depicts a side and front view respectively of a docking system 40 according to an embodiment arranged for connection to an external terminal (not shown), e.g. a desktop computer. In this embodiment, the extending part 31 of the docking system 40 is mounted on a supporting structure 50. The supporting substrate 50 may be fixable on a flat surface (not shown), e.g. a desk, but may also just rest on this surface. The dockings system 40 may be arranged to accommodate a cable 51 in a way known to persons skilled in the art for connecting the docking system 40 to an external device, e.g. desktop computer.

Figure 8A:
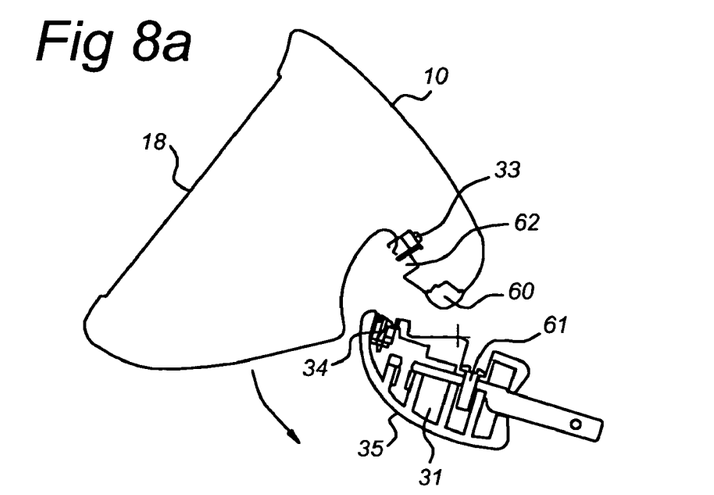
FIGS. 8a, 8b, 8c schematically depict a second concept of connecting according to embodiments of the present invention.
Figures 8B, 8C:
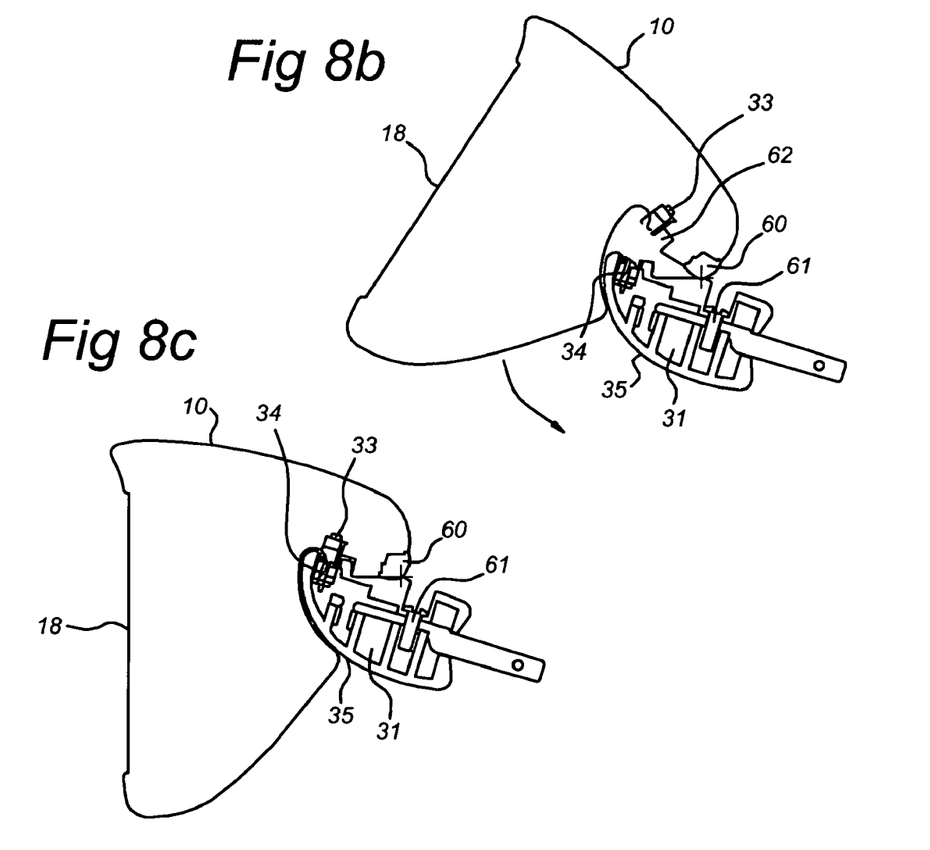

FIGS. 8a, 8b, 8c schematically depict a second concept of connecting according to embodiments of the present invention. In this embodiment, again, a navigation device 10 and an extending part 31 of a docking system, separately shown in FIG. 8a, are connected by using the guiding outer surface 35 of the extending part 31 as depicted in FIG. 8a to establish a connection between connecting elements 33, 34 as shown in FIG. 8c. In this second concept of connecting use is made of an additional recess or undercut 62 besides the connecting element 33 of the navigation device 10. The additional recess 62 ensures that the connecting elements 33, 34 are held clear from each other until it is engaged by the extending part 31 of the docking system. It minimizes the risk of damage to connecting elements 33, 34.

In FIGS. 8a-8c only the extending part 31 is shown. It may again be connected to the docking station via fixation elements like screws 61 or the like. To prevent wear at the pivoting point, in FIGS. 8a-8c depicted by a thin-lined cross, the navigation device 10 may be provided with a buffer element 60, for instance a rubber buffer element.

Further, note that the recess of navigation device 10 is different in orientation from recess 32 in FIG. 4b. It must be understood that an orientation as shown in FIGS. 8a-c may also be applied to a recess 32, i.e. a recess without an additional recess 62. Additionally, the recess with an additional recess 62 as shown in FIGS. 8a-8c may also be oriented in the way as shown in FIG. 4b.

Experiments with typical connecting elements for navigation systems have shown that a good performance can be obtained if the pivoting point is between about 10-20 mm away from the centre of connecting element 33. In case of a male type connecting element, i.e. one or more connecting pins 36, the size of the pin will proportionally affect aforementioned distance if the angle required to attach/detach the docking system 40 and navigation device 10 remains the same.

The navigation device 10 may be connected to different types of docking systems 40. It is thus for instance possible to use the navigation device 10 in a vehicle, for instance by using the embodiment depicted in FIGS. 5a, 5b, disconnect the navigation device 10 upon arrival at a destination and consecutively connect the navigation device 10 to the docking system 40 as depicted in FIGS. 7a, 7b for planning a new route in cooperation with an external device, e.g. a desktop computer. Due to the guiding outer surface 35 of the extending part 31 of the docking systems 40, the connecting elements 33, 34 in the navigation device 10 and docking systems 40 respectively endure a minimum deterioration as a result of regular (dis)connections of the two structures 10, 40.

To ensure that upon full engagement, the docking system 40 and navigation device 10 remain positioned with respect to each other, a retractable peg may be provided. A retractable peg may be of a door latch/lock type, i.e. a retractable/sliding peg on a door which engages with a hole in a door jam, preventing the door from rotating around its hinges. The peg may engages through the curved surfaces of both structures 10, 40. In this way, for instance a bumpy road has a minimum effect on the engagement of the two connecting elements 33, 34.

While specific embodiments of the invention have been described above, it will be appreciated that the invention may be practiced otherwise than as described. For example, the invention may take the form of a computer program containing one or more sequences of machine-readable instructions describing a method as disclosed above, or a data storage medium (e.g. semiconductor memory, magnetic or optical disk) having such a computer program stored therein. It will be understood by a skilled person that all software components may also be formed as hardware components.

The descriptions above are intended to be illustrative, not limiting. Thus, it will be apparent to one skilled in the art that modifications may be made to the invention as described without departing from the scope of the claims set out below.

The invention claimed is:

1. Navigation system for providing navigational directions, comprising:
    a navigation device comprising a body provided with a receiving part having an inner surface provided with a connecting element of a first connection type; and
    a docking system arranged to accommodate said navigation device, said docking system comprising an extending part provided with a connecting element of a second connection type, said connecting element of the second connection type arranged for connection to said connecting element of the first connection type; wherein said extending part comprises an outer surface with a shape substantially similar to at least part of the inner surface of the receiving part of the navigation device and said receiving part is slideable along a trajectory over said outer surface, said trajectory being determined by the shape of both the inner surface of the receiving part of the navigation device and the outer surface of the extending part of the docking system, and said trajectory being such that said connecting element of the first connection type is guided towards the connecting element of the second connection type for connection.

2. Navigation system according to claim 1, wherein the outer surface has a convex shape and the inner surface of the receiving part of the navigation device has a concave shape.

3. Navigation system according to claim 2, wherein said connecting element of the first connection type is a male connecting element and said connecting element of the second connection type is a female connecting element.

4. Navigation system according to claim 2, wherein said docking system comprises a supporting structure and said extending part of the docking system is pivotably mounted on said supporting structure.

5. Dashboard comprising a docking system suitable for a navigation system according to claim 2.

6. Vehicle comprising a navigation system according to claim 2.

7. Navigation device suitable for use in a navigation system according to claim 2.

8. Docking system suitable for use in a navigation system according to claim 2.

9. Navigation system according to claim 1, wherein said connecting element of the first connection type is a male connecting element and said connecting element of the second connection type is a female connecting element.

10. Navigation system according to claim 9, wherein said docking system comprises a supporting structure and said extending part of the docking system is pivotably mounted on said supporting structure.

11. Navigation system according to claim 1, wherein said docking system comprises a supporting structure and said extending part of the docking system is pivotably mounted on said supporting structure.

12. Navigation system according to claim 11, wherein said supporting structure comprises a suction cup for arranging a disjoinable connection with a substantially flat surface.

13. Navigation system according to claim 11, wherein said supporting structure comprises at least one click spring for arranging a disjoinable connection with a substantially flat surface.

14. Navigation system according to claim 11, wherein said supporting structure is arranged to accommodate a cable.

15. Dashboard comprising a docking system suitable for a navigation system according to claim 1.

16. Vehicle comprising a navigation system according to claim 1.

17. Navigation device suitable for use in a navigation system according to claim 1.

18. Docking system suitable for use in a navigation system according to claim 1.

19. Method of forming a navigation system, the method comprising:
    providing a navigation device comprising a body provided with a receiving part having an inner surface provided with a connecting element of a first connection type;
    providing a docking system arranged to accommodate said navigation device, said docking system comprising an extending part provided with a connecting element of a second connection type, said connecting element of the second connection type arranged for connection to said connecting element of the first connection type, and said extending part comprising an outer surface with a shape substantially similar to at least part of said inner surface of the receiving part of the navigation device;

sliding said receiving part along a trajectory over said outer surface, said trajectory being determined by the shape of both the inner surface of the receiving part of the navigation device and the outer surface of the extending part of the docking system, and said trajectory being such that said connecting element of the first connection type is substantially guided towards the connecting element of the second connection type for connection.

* * * * *